(12) United States Patent
Inaba

(10) Patent No.: US 11,392,701 B2
(45) Date of Patent: Jul. 19, 2022

(54) INFORMATION PROCESSING APPARATUS AND METHOD FOR CONTROLLING THE SAME

(71) Applicant: CANON KABUSHIKI KAISHA, Tokyo (JP)

(72) Inventor: Keishi Inaba, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 16/845,376

(22) Filed: Apr. 10, 2020

(65) Prior Publication Data
US 2020/0334360 A1 Oct. 22, 2020

(30) Foreign Application Priority Data
Apr. 19, 2019 (JP) .............................. JP2019-080470

(51) Int. Cl.
*G06F 21/57* (2013.01)
*G05B 19/042* (2006.01)
*G05B 19/04* (2006.01)

(52) U.S. Cl.
CPC ....... *G06F 21/572* (2013.01); *G05B 19/0426* (2013.01); *G06F 21/575* (2013.01); *G05B 2219/25205* (2013.01); *G06F 2221/033* (2013.01)

(58) Field of Classification Search
CPC ...... G06F 21/575; G06F 21/572; G06F 21/74; G06F 21/10; G06F 21/52; G06F 21/71; G05B 19/0426; G05B 2219/25205
USPC ................................................. 713/1, 2, 100
See application file for complete search history.

(56) References Cited

U.S. PATENT DOCUMENTS

| | | | |
|---|---|---|---|
| 10,354,073 B2 | 7/2019 | Koike et al. | |
| 2007/0192610 A1* | 8/2007 | Chun ............ | G06F 21/575 |
| | | | 713/176 |
| 2007/0300207 A1* | 12/2007 | Booth ........... | G06F 21/575 |
| | | | 717/126 |

FOREIGN PATENT DOCUMENTS

JP     2017-033149 A     2/2017

* cited by examiner

*Primary Examiner* — Michael J Brown
(74) *Attorney, Agent, or Firm* — Venable LLP

(57) ABSTRACT

According to the present invention, an information processing apparatus comprises a first controller that executes a first program code; a second controller that executes a second program code different from the first program code, and communication with the first controller; a storage device that stores the first program code to be executed by the first controller and the second program code to be executed by the second controller; and a verifier that verifies, before the first controller and the second controller execute respective program codes, the respective program codes, stored in the storage device.

14 Claims, 12 Drawing Sheets

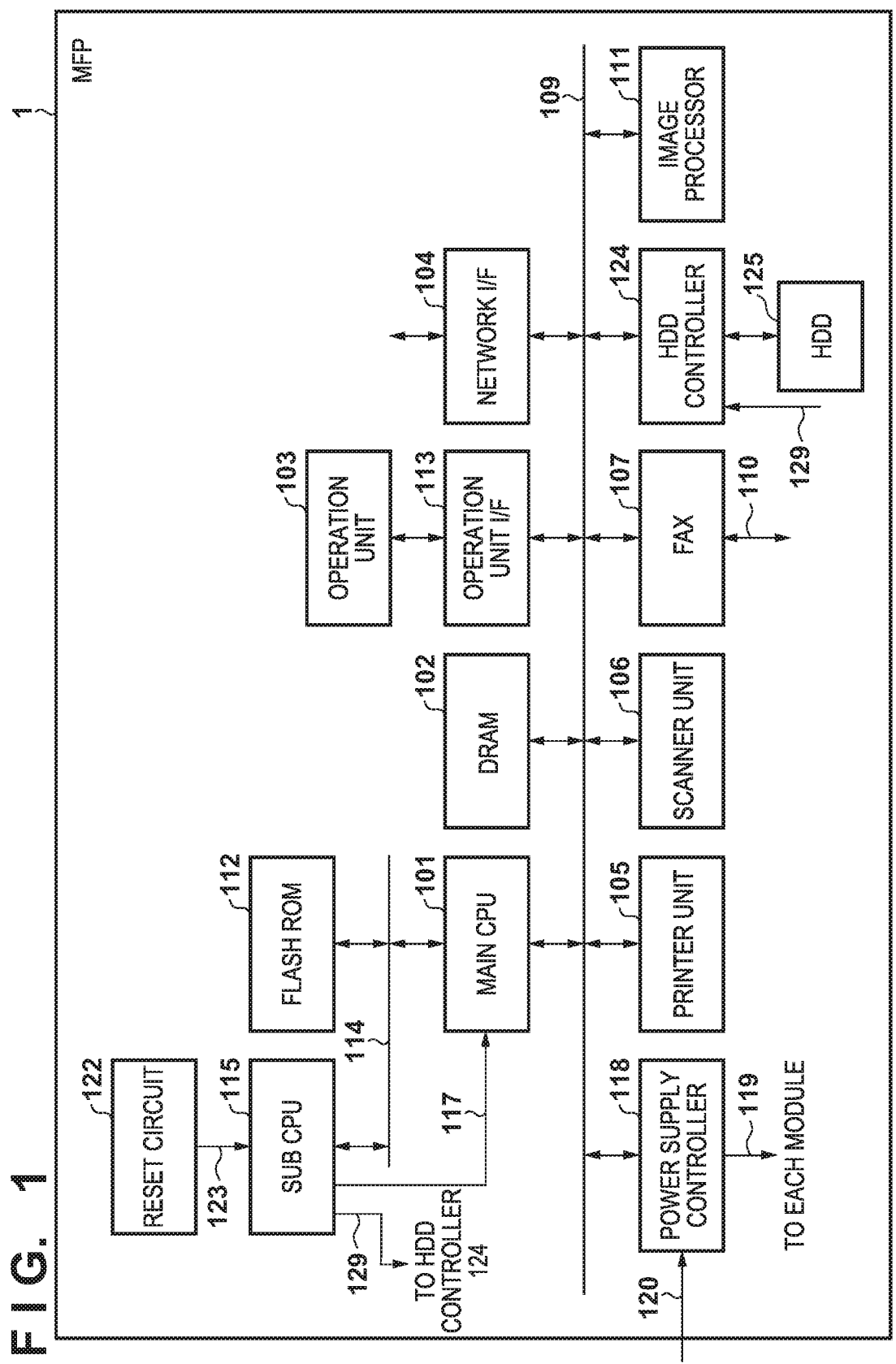

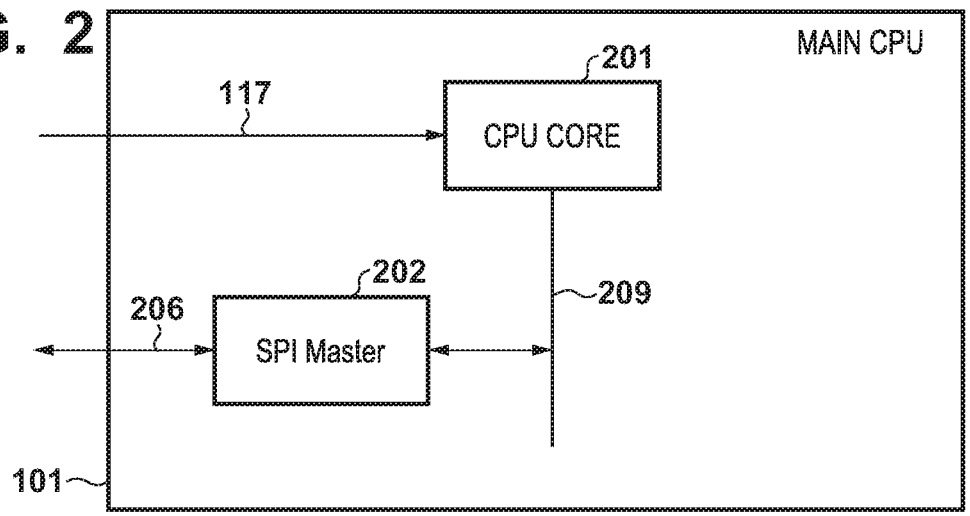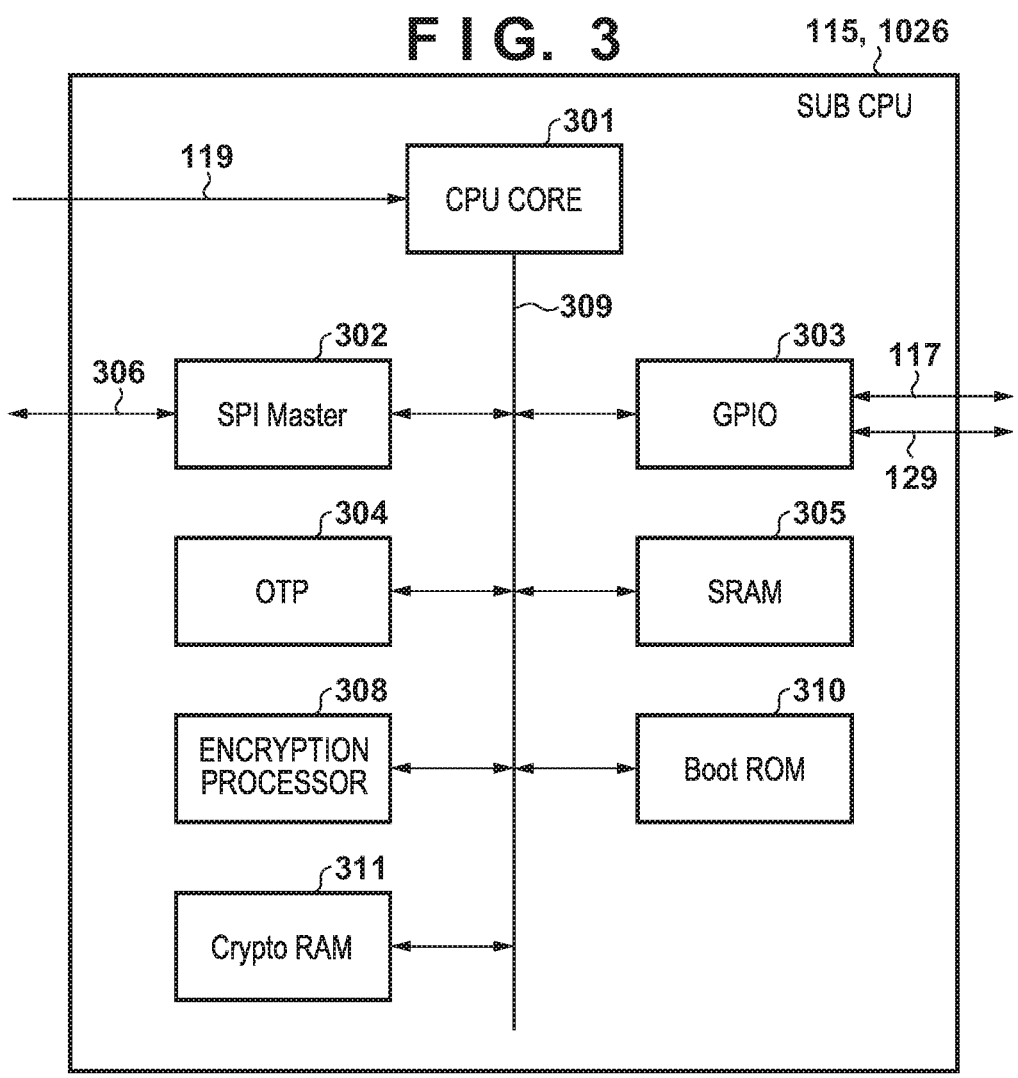

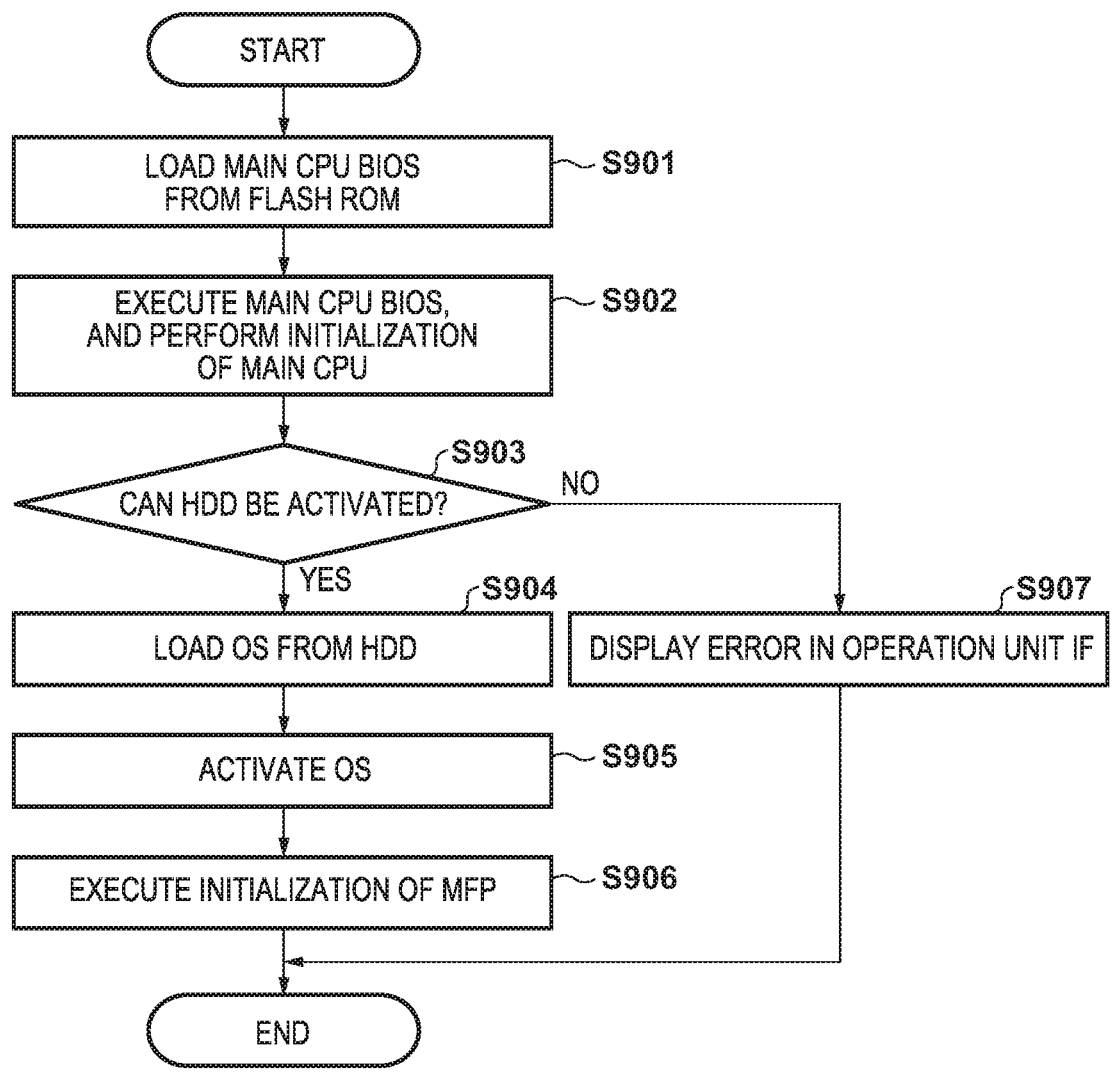

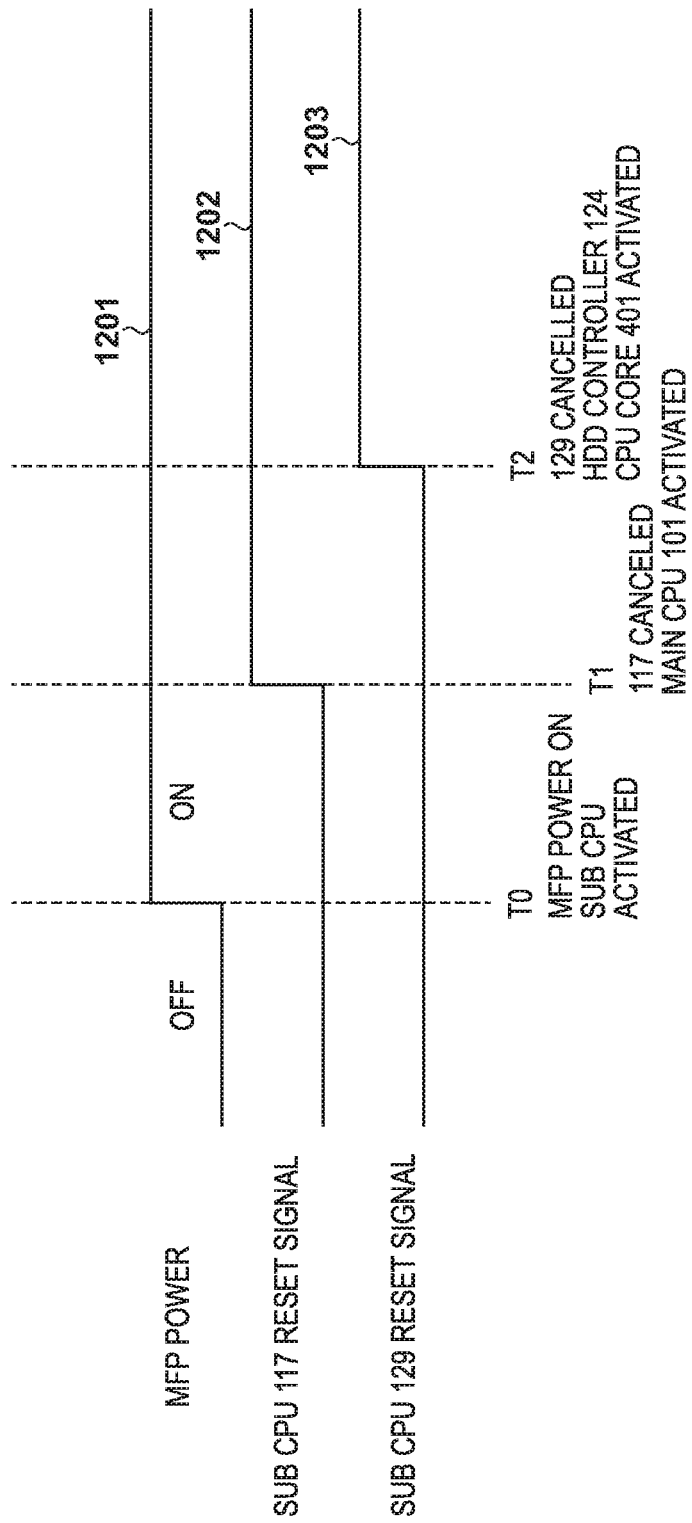

INFORMATION PROCESSING APPARATUS AND METHOD FOR CONTROLLING THE SAME

BACKGROUND OF THE INVENTION

Field of the Invention

The present invention relates to an information processing apparatus and a method for controlling the same.

Description of the Related Art

Conventionally, as a boot code alteration detection method of an information apparatus such as an image processing apparatus (to be referred to as an MFP hereinafter) or the like, there is a method of verifying whether a boot code has been altered by causing a sub CPU to read out the boot code to be executed by a main CPU before the main CPU is activated. If the sub CPU detects that the boot code obtained from the readout has been altered, recovery will be performed by copying a master boot code onto the boot code detected to have been altered or error control will be performed to stop the operation of the sub CPU. For example, Japanese Patent Laid-Open No. 2017-33149 proposes a technique in which a CPU verifies designated software and will set the verified designated software as the software to be used by the processor at the time of activation, but will safely update software that has been detected to have been altered.

However, the conventional technique described above has the following problem. In general, for example, in a case in which another controller (for example, a function controller that controls functions of the apparatus) is included separately from a main CPU, the function controller will operate based on another CPU which is different from the main CPU. If a program code such as an activation code, an execution code, or the like of the other CPU is altered, the function control operation cannot be performed, and the reliability of the apparatus will degrade.

SUMMARY OF THE INVENTION

The present invention enables realization of secure activation of an apparatus by suitably verifying the safety of a program code which is to be executed by a controller different from a main CPU of the apparatus.

One aspect of the present invention provides an information processing apparatus comprising: a first controller that executes a first program code; a second controller that executes a second program code different from the first program code, and communication with the first controller; a storage device that stores the first program code to be executed by the first controller and the second program code to be executed by the second controller; and a verifier that verifies, before the first controller and the second controller execute respective program codes, the respective program codes, stored in the storage device.

Another aspect of the present invention provides an information processing apparatus comprising: a first controller that executes a first program code; a second controller that executes a second program code different from the first program code, and communication with the first controller; a first storage device that stores the first program code to be executed by the first controller; a second storage device that stores the second program code to be executed by the second controller; and a verifier that verifies, before the first controller and the second controller execute respective program codes stored in the first storage device and the second storage device, the respective program codes stored in the first storage device and the second storage device.

Still another aspect of the present invention provides an information processing apparatus comprising: a first controller that executes a first program code; a second controller that executes a second program code different from the first program code, and communication with the first controller; a first storage device that stores the first program code to be executed by the first controller; a second storage device that stores the second program code to be executed by the second controller; a first verifier that verifies the first program code stored in the first storage device before the first controller executes the first program code stored in the first storage device; and a second verifier that verifies the second program code stored in the second storage device before the second controller executes the second program code stored in the second storage device.

Yet still another aspect of the present invention provides a method for controlling an information processing apparatus that includes a first controller that executes a first program code, a second controller that executes a second program code different from the first program code, and communication with the first controller, and a storage device that stores the first program code to be executed by the first controller and the second program code to be executed by the second controller, the method comprising: verifying, before the first controller and the second controller execute respective program codes, the respective program codes, stored in the storage device.

Still yet another aspect of the present invention provides a method for controlling an information processing apparatus that includes a first controller that executes a first program code, a second controller that executes a second program code different from the first program code, and communication with the first controller, a first storage device that stores the first program code to be executed by the first controller, and a second storage device that stores the second program code to be executed by the second controller, the method comprising; verifying, before the first controller and the second controller execute respective program codes stored in the first storage device and the second storage device, respectively, the respective program codes stored in the first storage device and the second storage device.

Yet still another aspect of the present invention provides a method for controlling information processing apparatus that includes a first controller that executes a first program code, a second controller that executes a second program code different from the first program code, and communication with the first controller, a first storage device that stores the first program code to be executed by the first controller, and a second storage device that stores the second program code to be executed by the second controller, the method comprising: verifying the first program code stored in the first storage device before the first controller executes the first program code stored in the first storage device; and verifying the second program code stored in the second storage device before the second controller executes the second program code stored in the second storage device.

Further features of the present invention will become apparent from the following description of exemplary embodiments (with reference to the attached drawings).

BRIEF DESCRIPTION OF THE DRAWINGS

FIG. 1 is a block diagram showing the arrangement of an MFP according to one embodiment;

FIG. 2 is a block diagram showing the arrangement of a main CPU according to one embodiment;

FIG. 3 is a block diagram showing the arrangement of a sub CPU according to one embodiment;

FIG. 11 is a flowchart showing processing of a main CPU according to one embodiment; and FIG. 12 is a timing chart showing the timings of reset signals according to one embodiment.

DESCRIPTION OF THE EMBODIMENTS

Figure 4:
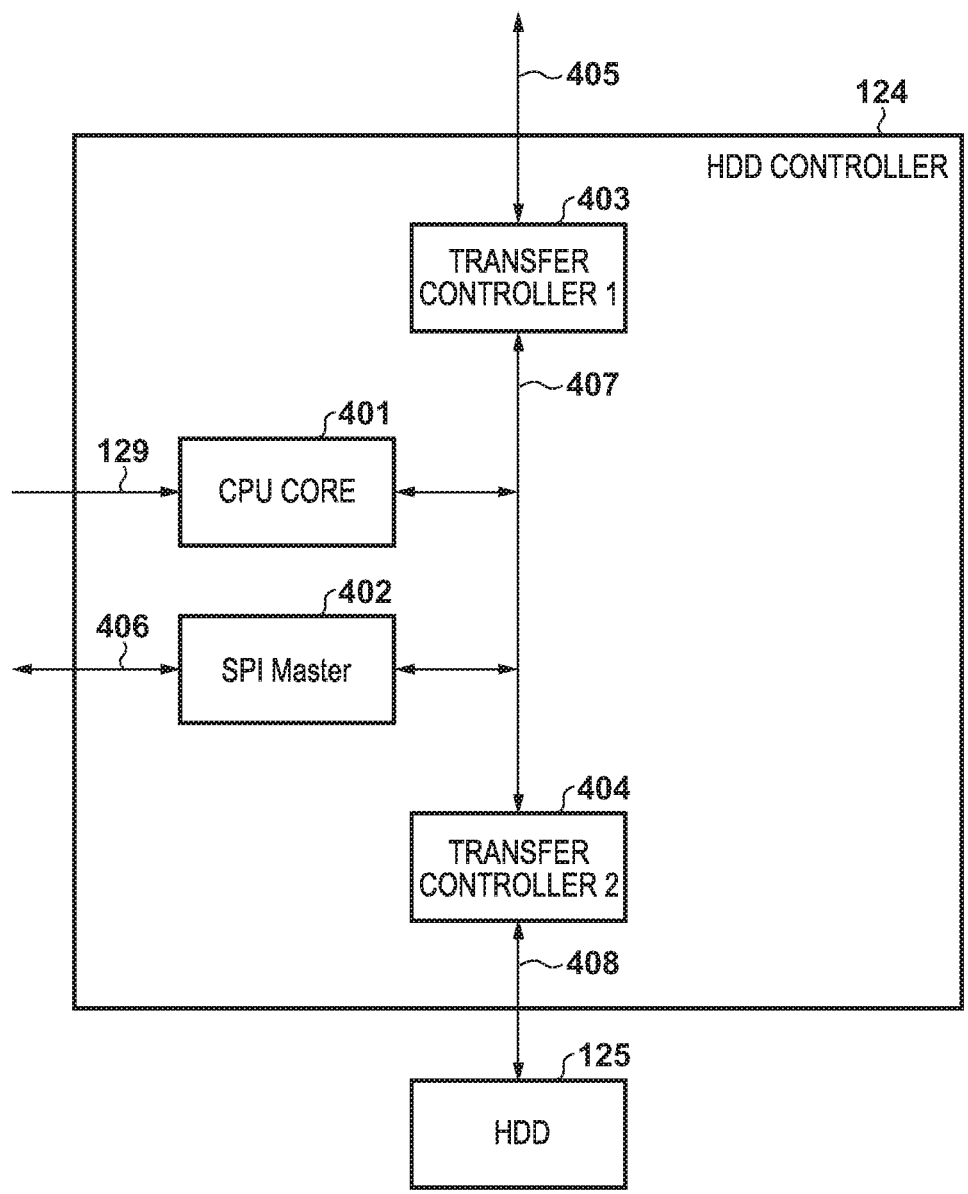
FIG. 4 is a block diagram showing the arrangement of an HDD controller according to one embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that a multi-function peripheral (MFP) will be exemplified as an information processing apparatus according to an embodiment. However, the application range of the present invention is not limited to a multi-function peripheral. The present invention is applicable as long as it is an information processing apparatus. Note that, unless otherwise mentioned, the present invention is applicable, as a matter of course, to a single device or a system formed by a plurality of devices as long as the function of the present invention can be executed.

First Embodiment

<Arrangement of Information Processing Apparatus>

The first embodiment of the present invention will be described hereinafter. The arrangement of an MFP 1 according to this embodiment will be described with reference to FIG. 1. The MFP 1 mainly includes a main CPU 101, a DRAM 102, an operation unit 103, a network OF 104, a printer unit 105, a scanner unit 106, a FAX 107, an image processor 111, a flash ROM 112, an operation unit OF 113, and a sub CPU 115. In addition, the MFP 1 includes a power supply controller 118, a reset circuit 122, an HDD controller 124, and an HDD 125.

The main CPU 101 is a first controller and controls the overall MFP 1. The DRAM (Dynamic Random Access Memory) 102 stores program codes to be executed by the main CPU 101, and functions as a work area for temporary data.

The operation unit 103 notifies, via the operation unit OF 113, the main CPU 101 of an operation by a user. The network I/F 104 connects to a LAN 130 to control communication with an external device. The printer unit 105 is an image formation unit that prints image data on the surface of a paper sheet. The scanner unit 106 is a reading unit that optically reads an image on the surface of a paper sheet and converts the read image into an electrical signal to generate a scan image. The FAX 107 connects to a public line 110 to perform facsimile communication with an external device.

The HDD 125 is a non-volatile storage device, stores program codes to be executed by the main CPU 101 via the HDD controller 124, and is used as a spooling area for a print job, a scan job, and the like. The HDD controller 124 is a second controller that controls a load (HDD). This HDD controller 124 functions as a bridge between the main CPU 101 and the HDD 125 by communicating with the main CPU 101 and controlling data input to and data output from the HDD 125 in accordance with a control command from the main CPU 101. A program code (an HDD CPU BIOS FW 507) to be executed by a CPU (a CPU core 401) of the HDD controller 124 is stored in the flash ROM 112 and is a program that allows the HDD controller to function as a bridge between the main CPU 101 and the HDD 125. That is, the HDD controller 124 transfers data transmitted by the main CPU 101 to the HDD 125 and transfers data read out from the HDD 125 to the main CPU 101. The communication between the main CPU 101 and the HDD 125 is controlled by this function. This function is implemented when the CPU core 401 (to be described later) executes the HDD CPU BIOS FW 507. Also, the HDD CPU BIOS FW 507 includes a program code for encrypting and decrypting data, and the CPU core 401 encrypts and decrypts data to be exchanged between the main CPU 101 and the HDD 125 in accordance with the program code. A reset signal 129 is output from a GPIO port of the sub CPU 115 and is connected to the HDD controller 124 for reset processing. Hence, the sub CPU 115 and the HDD controller 124 can be connected by a signal line for transmitting a reset signal. Note that although an HDD controller that performs the role of a bridge between the main CPU and the HDD will be exemplified as the second controller for controlling the load in this embodiment, the present invention is not limited to this, and it may be a controller for controlling another load. For example, it may be an engine controller for a printer, a scanner, or the like, a power supply controller, a network controller, or the like.

Communication is performed by connecting the modules to each other by a signal bus 109. The FAX 107 and an external device are connected to each other by the public line 110. The image processor 111 executes processing to convert a print job received via the network OF 104 into image data suitable for printing by the printer unit 105 and processing operations such as noise removal, color space conversion, rotation, compression, and the like on a scanned image read by the scanner unit 106. The image processor also executes image processing on a scanned image stored in the HDD 125.

The flash ROM (flash Read Only Memory) 112 is a first storage device and stores programs that include a boot code to be executed by the main CPU 101 and default setting values of the MFP 1. The operation unit 103 and the signal bus 109 are connected to each other by the operation unit OF 113. The main CPU 101, the flash ROM 112 and the sub CPU 115 are connected to each other by a SPI (Serial Peripheral Interface) bus 114.

The sub CPU 115 is a verifier that reads out the boot code from the flash ROM 112 to verify the corresponding program before the main CPU 101 is activated at the time of activation of the MFP 1. Program verification according to this embodiment is an operation performed to verify whether a predetermined program code has changed due to intentional alteration or deterioration over time. Note that although the term "alteration" will be used in the description hereinafter for the sake of descriptive convenience, assume that the term "alteration" according to this embodiment also includes change due to deterioration over time in addition to the intentional alteration as described above. As a verification method, for example, public key information (a value obtained by performing public key encryption on a hash value) of a digital signature of a boot code will be stored in an OTP (One Time Programmable) memory area 304 (to be described later), in the sub CPU 115 at the time of manufacture. The sub CPU 115 decrypts the boot code which has been read out by using this public key information to perform verification. RSA 2048, ECDSA, or the like can be used as the public key encryption method. Note that, as shown in FIGS. 1 and 3, the sub CPU 115 is a microcomputer independent of the main CPU 101, and is a microcomputer that supports secure boot and stores its own boot code in a boot ROM 310. Also, the incorporated OTP memory area 304 described above is an area that is not rewritable, and data stored in the OTP memory area 304 cannot be altered.

A reset signal 117 is output from the GPIO port of the sub CPU 115, and a dedicated signal line is connected to a reset terminal of the main CPU 101. The power supply controller 118 controls power supply to each module in the MFP 1. A power supply line 119 is used to supply power to each module. A commercial AC power supply is supplied to a power supply line 120. When the system is powered on, the reset circuit 122 shifts a sub CPU reset signal 123 from "Lo" level to "Hi" level after a predetermined delay time has elapsed. The sub CPU reset signal 123 is output from the reset circuit 122 and is connected to the reset terminal of the sub CPU 115. When the sub CPU reset signal 123 shifts to "Hi" level, a reset state is canceled in the sub CPU 115, and the activation of the sub CPU 115 is started.

<Arrangement of Main CPU>

The arrangement of the main CPU 101 according to this embodiment will be described with reference to FIG. 2. The main CPU 101 includes a CPU core 201 and an SPI master 202.

The CPU core 201 is in charge of the basic functions of the CPU. The SPI master 202 connects to an external SPI device and performs data read and write. The SPI master 202 and the external SPI device are electrically connected to each other by an SPI bus 206. Modules of the main CPU 101 are connected to each other by a signal bus 209. The main CPU 101 is set in a reset state when the reset signal 117 output from the sub CPU 115 is at "Lo" level. On the other hand, the main CPU 101 is set to a reset canceled state when the reset signal 117 is at "Hi" level. When the reset signal 117 shifts from the reset state to the reset canceled state, the CPU core 201 first loads a main CPU BIOS 501 (FIG. 5) stored in the flash ROM 112 to the DRAM 102 and executes the main CPU BIOS 501. A detailed memory map of the flash ROM 112 will be described later with reference to FIG. 5.

<Arrangement of Sub CPU)

The arrangement of the sub CPU 115 according to this embodiment will be described with reference to FIG. 3. The sub CPU 115 includes a CPU core 301, an SPI master 302, a GPIO 303, the OTP memory area 304, an SRAM 305, an encryption processor 308, the boot ROM 310, and a Crypto RAM 311. According to this embodiment, the sub CPU 115, which supports secure boot, functions as a detector that detects an alteration by verifying the boot code (boot program) or the execution code (execution program) of each controller for controlling a load such as the main CPU 101, the HDD controller 124, or the like. These verification operations are performed before these controllers are activated, thus implementing secure boot.

The CPU core 301 is in charge of the basic functions of the CPU. The SPI master 302 connects to an external SPI device and performs data read and write. The GPIO (general-purpose input/output) 303 connects to an external device to perform data exchange. The OTP (One Time Programmable) memory area 304 is a memory area. In the OTP memory area 304, a value obtained by encrypting the hash value of a sub CPU FW (firmware) by a public key and an address of tag indicating the start address of the sub CPU FW are written, at the time of manufacture, as verification information to be used in the verification. Once written, the data written in this area cannot be rewritten again.

The SRAM 305 is used as a work memory of the sub CPU 115. The encryption processor 308 decrypts the hash value of the sub CPU FW from the value that has undergone public key encryption, and decrypts the hash value of the main CPU BIOS that has also undergone public key encryption. A signal bus 309 connects each module in the sub CPU. The boot ROM (Read Only Memory) 310 stores the boot code of the sub CPU 115. The main CPU 101 is set in the reset state when the reset signal 117 is at "Lo" level. The main CPU 101 is set in the reset canceled state when the reset signal 117 is at "Hi" level. When the reset signal 117 shifts from the reset state to the reset canceled state, the CPU core 301 will first read out its own boot code from the boot ROM 310 and execute the boot code. The Crypto RAM 311 stores highly confidential data and the like to be used in the encryption processor 308.

<Anangement of HDD Controller>

The arrangement of the HDD controller 124 according to the embodiment will be described next with reference to FIG. 4. The HDD controller 124 includes the CPU core 401, an SPI master 402, and transfer controllers 403 and 404.

The CPU core 401 is in charge of the basic functions of the CPU for controlling the HDD controller 124. The SPI master 402 connects to an external SPI device and performs data read and write. The transfer controllers 403 and 404 perform processing setting of the HDD 125 under the instruction of the CPU core 401, and control data transfer to/from the HDD 125.

In a readout operation of the HDD 125, the CPU core 401 sets the settings in the transfer controller 404 for the read-access of the HDD 125, and reads out the setting data from the HDD 125. The data that has been read out is written to the DRAM 102 via a SATA interface bus 408, the transfer controller 404, an internal data bus 407 of the HDD controller 124, the transfer controller 403, and a data bus 405.

In a write operation of the HDD 125, the CPU core 401 sets the transfer controller 404 to write data on the HDD 125. Subsequently, the write operation of the data transferred from the data bus 405 is performed on the HDD 125 via the transfer controller 403, the internal data bus 407 of the HDD controller 124, the transfer controller 404, and the SATA interface bus 408.

An SPI bus 406 electrically connects with an external SPI device. The modules of the HDD controller 124 are connected to each other by the internal data bus 407. The HDD controller 124 is set to the reset state when the reset signal 129 is at "Lo" level. On the other hand, the HDD controller 124 is set to the reset canceled state when the reset signal 129 is at "Hi" level. When the reset signal 129 shifts from the reset state to the reset canceled state, the CPU core 401 first loads the HDD CPU BIOS FW 507 stored in the flash ROM 112 to the SPI master 402 and executes the HDD CPU BIOS FW. That is, the HDD CPU BIOS FW 507 is a program that allows the HDD controller 124 to function as a bridge between the main CPU 101 and the HDD 125.

<Memory Map>

Figure 5:
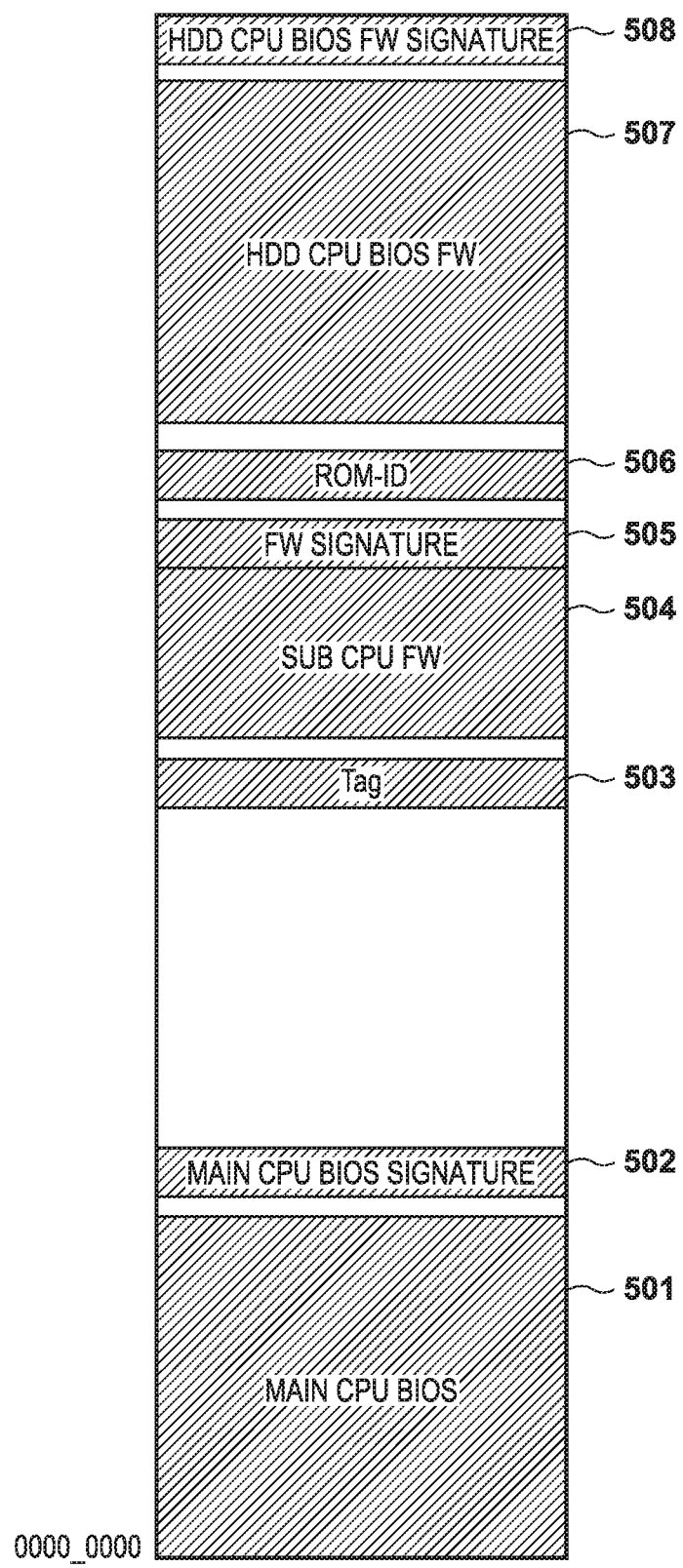
FIG. 5 is a view showing a memory map of a flash ROM according to one embodiment.

The memory map of the flash ROM 112 according to the embodiment will be described next with reference to FIG. 5. Note that the memory map to be described below is merely an example and is not intended to limit the present invention. That is, the stored information to be described below may be stored in a memory different from the flash ROM 112.

The main CPU BIOS 501 stores codes (programs) to be executed by the main CPU 101. A main CPU BIOS signature 502 stores an RSA signature value of the hash value of the main CPU BIOS 501. A tag 503 stores the start address of a sub CPU FW 504. The OTP memory area 304 stores the address of the tag 503 itself.

The sub CPU FW 504 stores codes to be executed by the sub CPU 115. A FW signature 505 stores the sub CPU FW 504 or an ECDSA signature value of a specific part of the start address of the sub CPU FW 504. A ROM-ID 506 stores the start address, the size, and the address of the BIOS signature of the main CPU BIOS 501. The HDD CPU BIOS FW 507 stores the BIOS and the FW program code to be executed by the CPU core 401 of the HDD controller 124. An HDD CPU BIOS FW signature 508 stores an RSA signature value of the hash value of the HDD CPU BIOS FW.

That is, the flash ROM 112 stores boot codes and execution codes to be executed by the main CPU 101 and the HDD controller 124, and all of these codes have the potential to be altered. Hence, according to this embodiment, safer activation is implemented by using the sub CPU 115 supporting secure boot to verify the validity of a code to be executed by a corresponding controller before the execution of the code. The detailed processing of the sub CPU 115 will be described hereinafter.

<Processing Procedure of Sub CPU 115>

Figure 6A:
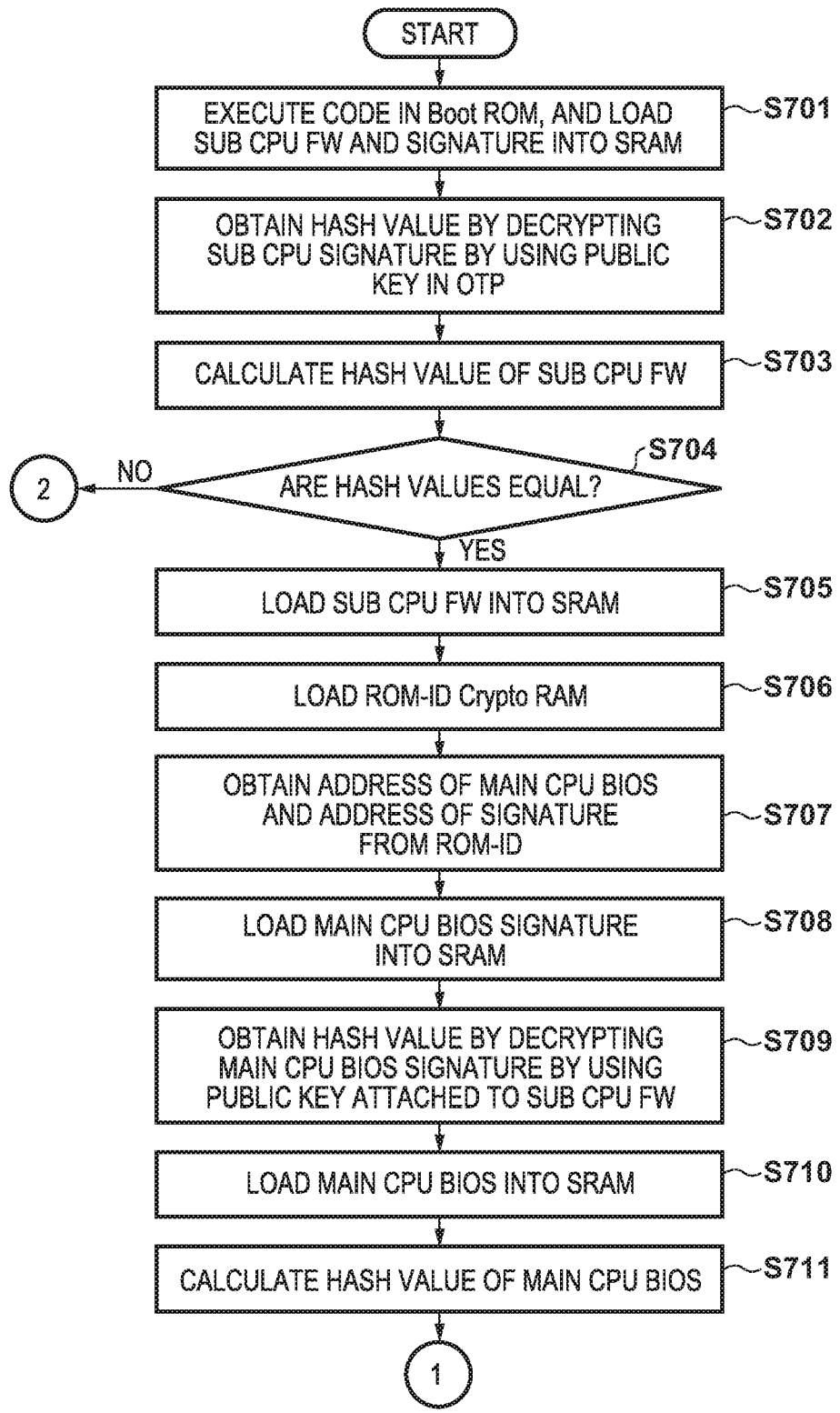
FIG. 6A is a flowchart showing processing of the sub CPU according to one embodiment.
Figure 6B:
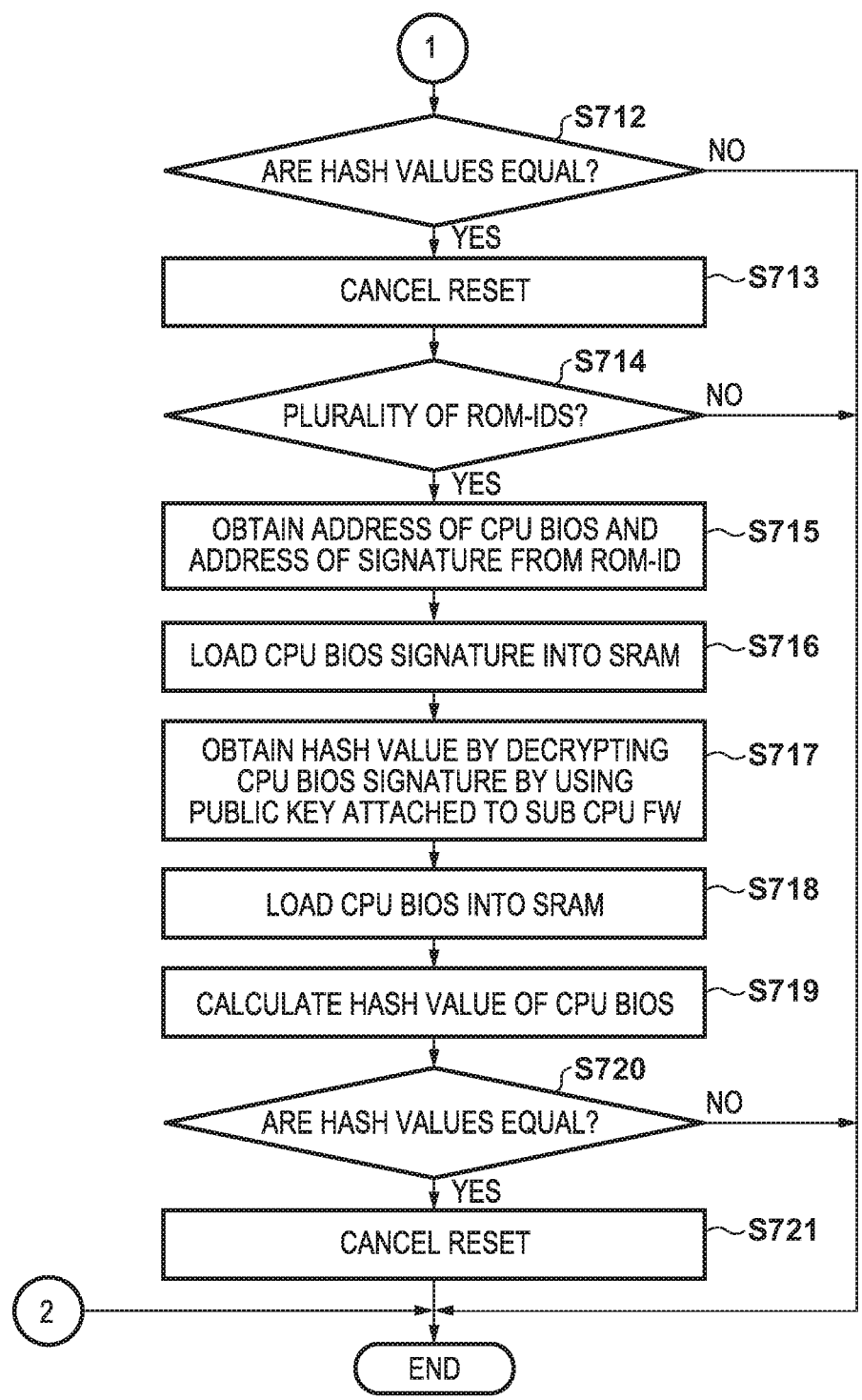
FIG. 6B is a flowchart showing the processing of the sub CPU according to one embodiment.

The processing procedure of the sub CPU 115 according to this embodiment will be described next with reference to FIGS. 6A, 6B, and 12. The processing of the flowcharts shown in FIGS. 6A and 6B is started at a timing T0 at which an MFP power supply 1201 is input in the timing chart shown in FIG. 12.

When the MFP 1 is powered on, in step S701, the CPU core 301 immediately reads out a code in the boot ROM 310 to the SRAM 305 and executes the code. The CPU core 301 loads, from the flash ROM 112 via the bus 114, the sub CPU FW 504 and the FW signature 505 into the SRAM 305.

Next, in step S702, the CPU core 301 causes the encryption processor 308 to decrypt the FW signature 505 by a public key in the OTP memory area 304 and obtain the correct hash value. Next, in step S703, the CPU core 301 causes the encryption processor 308 to calculate the hash value of the sub CPU FW 504. Subsequently, in step S704, the CPU core 301 compares the hash value obtained in step S502 with the hash value calculated in step S703. If the hash values do not match (NO), the processing ends. Otherwise (YES), the process advances to step S705, and the CPU core 301 loads the sub CPU FW 504 into the SRAM 305 and executes the sub CPU FW.

Next, in step S706, the CPU core 301 loads the ROM-ID 506 from the flash ROM 112 into the Crypto RAM 311. Next, in step S707, the CPU core 301 obtains the address of the main CPU BIOS 501 and the address of the main CPU BIOS signature 502 from the ROM-ID 506.

Next, in step S708, the CPU core 301 loads the main CPU BIOS signature 502 into the SRAM 305. Next, in step S709, the CPU core 301 causes the encryption processor 308 to use the public key, which is attached to the sub CPU FW 504, to decrypt the main CPU BIOS signature 502 and obtain the hash value. Subsequently, in step S710, the CPU core 301 loads the main CPU BIOS 501 into the SRAM 305. In addition, in step S711, the CPU core 301 causes the encryption processor 308 to calculate the hash value of the main CPU BIOS 501.

In step S712, the CPU core 301 compares the hash value obtained in step S709 with the hash value obtained in step S711. If the hash values do not match (NO), the processing ends. Otherwise (YES), the process advances to step S713, and the CPU core 301 cancels the reset state by controlling the GPIO 303 to output the reset signal 117 at "Hi" level. At a timing T1 of 1202 shown in FIG. 12, the reset signal 117 is canceled, and the main CPU 101 can be activated.

Next, in step S714, the CPU core 301 confirms whether there is a plurality of the ROM-IDs 506 obtained in step S706. If there are a plurality of ROM-IDs, the process advances to step S715. Otherwise, the processing ends. In step S715, the CPU core 301 obtains, from the flash ROM 112, the address of the HDD CPU BIOS FW 507 and the address of the HDD CPU BIOS FW signature 508 which were not loaded in step S707. Next, in step S716, the CPU core 301 loads the HDD CPU BIOS FW signature 508 to the SRAM 305.

Furthermore, in step S717, the CPU core 301 causes the encryption processor 308 to obtain a hash value by decrypting the HDD CPU BIOS FW signature 508 by using the public key attached to the sub CPU FW 504.

Next, in step S718, the CPU core 301 loads the HDD CPU BIOS FW 507 to the SRAM 305. Next, in step S719, the CPU core 301 causes the encryption processor 308 to calculate the hash value of the HDD CPU BIOS FW 507. Subsequently, in step S720, the CPU core 301 compares the hash value obtained in step S717 with the hash value obtained in step S719. If the hash values do not match (NO), the processing ends. Otherwise (YES), the process advances to step S721. In step S721, the CPU core 301 controls the GPIO 303 to output the reset signal 129 at "Hi" level. The reset signal 129 is canceled at a timing T2 of 1203 shown in FIG. 12, and the CPU core 401 of the HDD controller 124 is activated.

<Processing Procedure of HDD Controller>

Figure 7:
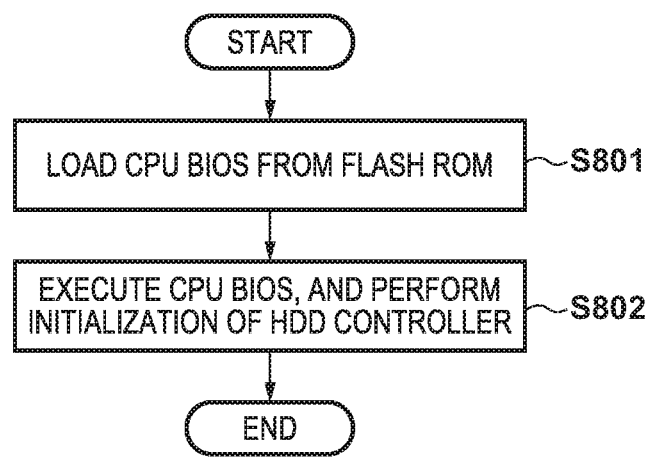
FIG. 7 is a flowchart showing processing of a CPU of the HDD controller according to one embodiment.

The processing procedure of the HDD controller 124 according to this embodiment will be described with reference to FIG. 7. After the reset signal 129 is canceled in step S721 of FIGS. 6A and 6B described above, the processing of the CPU core 401 is started.

After the CPU core 401 has performed the BIOS verification and the reset state of the CPU core 401 has been canceled, the CPU core 401 immediately loads, in step S801, the HDD CPU BIOS FW 507 stored in the flash ROM 112. The loading area in this case may be the DRAM 102 or a ROM (not shown) provided in the HDD controller 124. Next, in step S802, the CPU core 401 executes the HDD CPU BIOS FW 507 that has been loaded, executes the initialization processing of inputs to/outputs from the CPU core 401, and ends the processing. As a result, the HDD controller 124 is initialized and shifts to a state in which data exchange with the HDD 125 can be performed.

As described above, an information processing apparatus according to this embodiment includes a main CPU that executes processing in accordance with a program code and an HDD controller that controls communication with the main CPU and communication with a predetermined load in accordance with another predetermined program code. In addition, the information processing apparatus includes a flash ROM that stores program codes to be executed by the main CPU and the HDD controller. Furthermore, the information processing apparatus includes a sub CPU that verifies each program code stored in the flash ROM before the main CPU and the HDD controller execute their respective program codes. More specifically, the sub CPU first verifies the program code of the main CPU and cancels the reset signal to the main CPU, if an alteration is not detected, to activate the main CPU. Subsequently, the sub CPU verifies the program code of the HDD controller and cancels the reset signal output to the HDD controller if an alteration is not detected. As a result, according to this embodiment, the safety of a program code which is to be executed by a controller different from a main CPU can also be suitably verified, and secure activation of the apparatus can be implemented.

Note that the present invention is not limited to the above-described embodiment, and various modifications are possible. Although the above first embodiment described a case in which the code of the main CPU 101 and the code of the HDD controller 124 are stored in the same memory served by the flash ROM 112, the respective codes may be stored in different memories as described below in the second embodiment. In such a case, the sub CPU 115 will verify codes stored in two memories. Note that in the second embodiment hereinafter will describe an example in which memories for storing codes to be executed by a plurality of CPUs will be arranged in correspondence with the plurality of CPUs, and sub CPUs for verifying the memories will be arranged in correspondence with the memories.

Second Embodiment

The second embodiment of the present invention will be described hereinafter. Although the above first embodiment described an example in which the sub CPU 115 integrally verifies the boot codes and the like of all of the controllers, boot code verification will be performed for each CPU of a plurality of CPUs in this embodiment. Note that unless otherwise mentioned, the present invention is applicable, as a matter of course, to a single device or a system formed by a plurality of devices as long as the function of the present invention can be executed.

<Arrangement of Information Processing Apparatus>

Figure 8:
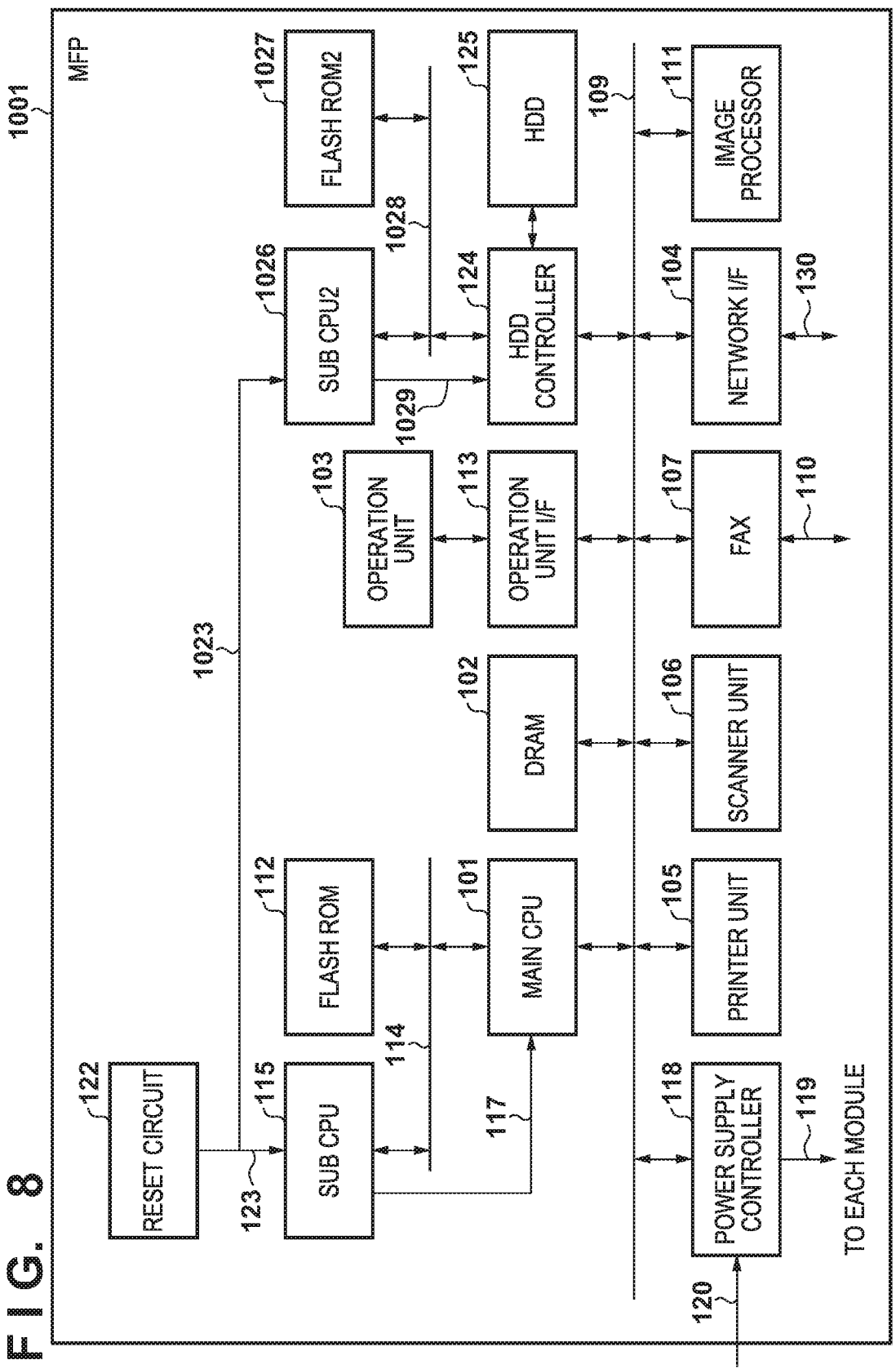
FIG. 8 is a block diagram of an MFP of one embodiment.

The arrangement of an MFP 1001 according to the embodiment will be described next with reference to FIG. 8. Note that the same reference numerals denote components and control processes similar to those of the above-described first embodiment hereinafter.

The MFP 1001 according to this embodiment includes, in addition to the components of the MFP 1 shown in FIG. 1, a sub CPU 1026 (second verifier) and a flash ROM 1027 (second storage device). When the system is powered on, a reset circuit 122 causes sub CPU reset signals 123 and 1023 to shift from "Lo" level to "Hi" level after a predetermined delay time has elapsed. The sub CPU reset signal 123 is output from the reset circuit 122 and is connected to the reset terminal of a sub CPU 115. The reset state of the sub CPU 115 is canceled and activation is started when the sub CPU reset signal 123 is changed to "Hi" level. On the other hand, the sub CPU reset signal 1023 is connected to the reset terminal of the sub CPU 1026. The reset state of the sub CPU 1026 is canceled and activation is started when the sub CPU reset signal 1023 is changed to "Hi" level. Note that the sub CPU 1026 has the same arrangement as the sub CPU 115. That is, in this embodiment, a sub CPU that supports secure boot for verifying a boot code or an execution code is arranged in correspondence with each CPU (a main CPU 101 and an HDD controller 124).

The sub CPU 1026 verifies, at the activation of the MFP 1001, whether an alteration has occurred by reading out a boot code from a flash ROM 1027. As an alteration detection method, for example, public key information (a value obtained by performing public key encryption on a hash value) of a digital signature of a boot code will be stored in an OTP (One Time Programmable) memory area in the sub CPU 1026 at the time of production. The boot code that has been read out is decrypted by using this public key information to perform verification. RSA 2048, ECDSA, or the like can be used as the public key encryption method. A reset signal 1029 is output from a GPIO port of the sub CPU 1026 and connected via a dedicated signal line to the HDD controller 124 for reset processing. The sub CPU 1026, the flash ROM 1027, and the HDD controller 124 are connected to each other by an SPI bus 1028.

<Memory Map>

Figure 9:
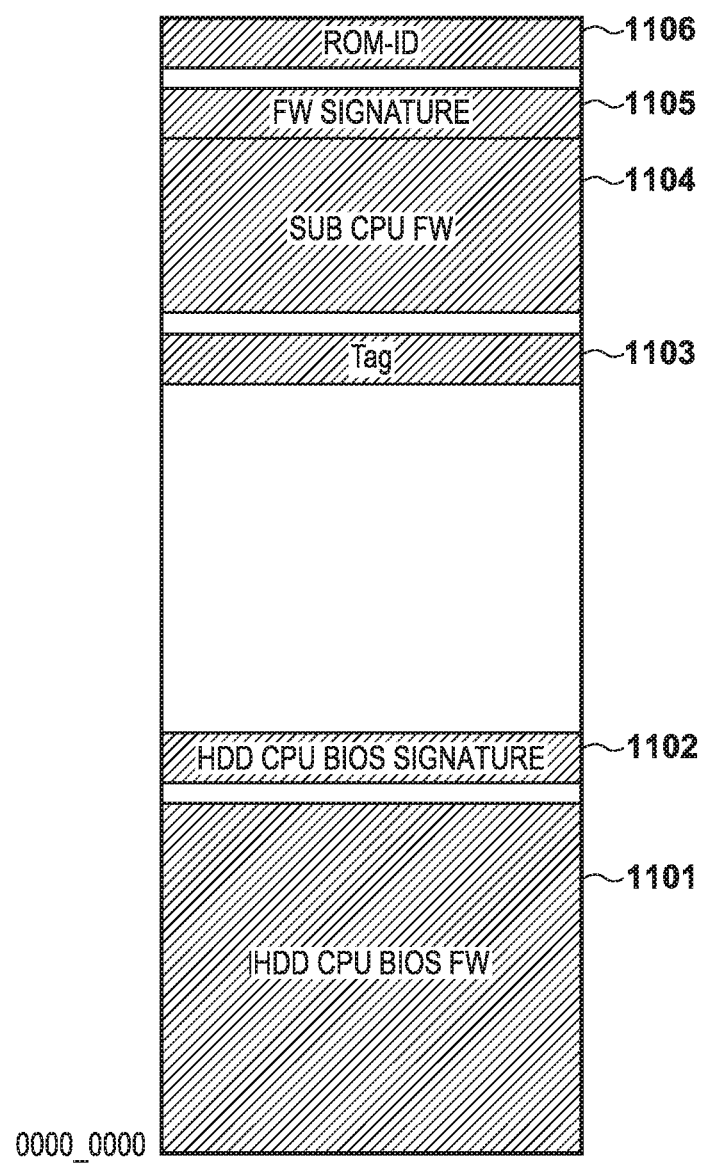
FIG. 9 is a memory map of a flash ROM of a sub CPU according to one embodiment.

The memory map of the flash ROM 1027 will be described next with reference to FIG. 9. Note that the memory map to be described below is merely an example and is not intended to limit the present invention. That is, the stored information to be described below may be stored in a memory different from the flash ROM 1027. In addition, the stored information to be described below is information to be stored in the flash ROM 1027 in place of a flash ROM 112, that is, is information which will not be stored in the flash ROM 112.

An HDD CPU BIOS FW 1101 stores a code to be executed by a CPU core 401 of the HDD controller 124. An HDD CPU BIOS FW signature 1102 stores an RSA signature value of a hash value of the HDD CPU BIOS FW 1101. A tag 1103 stores the start address of a sub CPU FW 1104. The address of the tag 1103 itself is stored in an OTP memory area 304 of the sub CPU 1026 described in FIG. 3.

The sub CPU FW 1104 stores a code to be executed by the sub CPU 1026. An FW signature 1105 stores the sub CPU FW 1104 or an ECDSA signature value of a specific part of the start address of the sub CPU FW 1104. A ROM-ID 1106 stores the start address, the size, the address of the HDD CPU BIOS FW signature of the main HDD CPU BIOS FW 1101.

<Processing Procedure of Sub CPU 1026>

Figure 10:
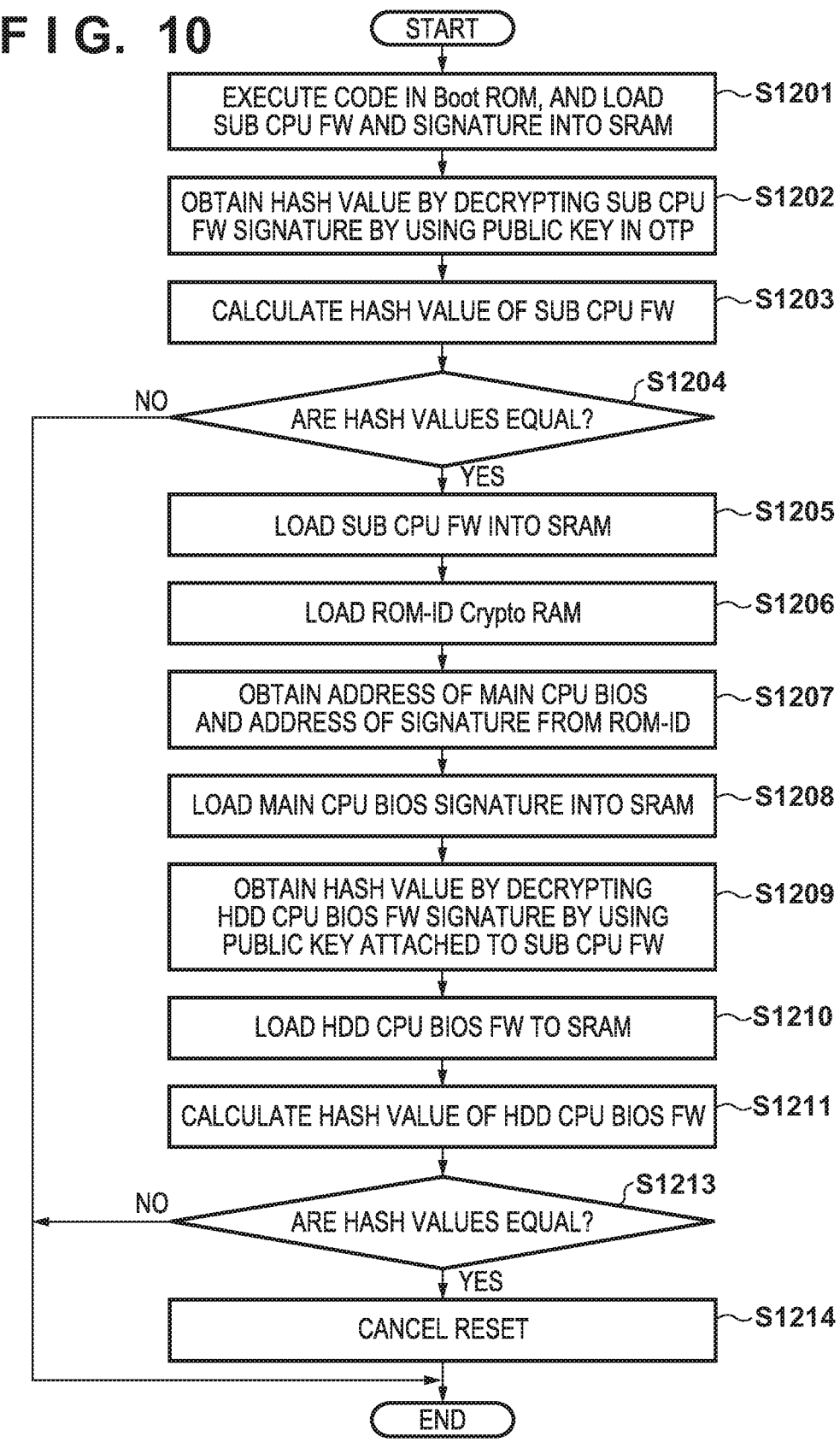
FIG. 10 is a flowchart showing processing of the sub CPU according to one embodiment.

The processing procedure of the sub CPU 1026 according to the embodiment will be described next with reference to FIG. 10.

When the MFP 1001 is powered on, a CPU core 301 of the sub CPU 1026 immediately reads out, in step S1201, the code in a boot ROM 310 to a SRAM 305 and executes the code. The CPU core 301 loads the sub CPU FW 1104 from the flash ROM 1027 to the SRAM 305 via the SPI bus 1028. Next, in step S1202, the CPU core 301 causes an encryption processor 308 to obtain the correct hash value by decrypting the FW signature 1105 by using a public key of the OTP memory area 304. Furthermore, in step S1203, the CPU core 301 causes the encryption processor 308 to calculate the hash value of the sub CPU FW 1104.

Next, in step S1204, the CPU core 301 compares the hash value obtained in step S1202 with the hash value calculated in step S1203. If the hash values do not match (NO), the processing ends. Otherwise (YES), the process advances to step S1205, and the CPU core 301 loads the sub CPU FW 1104 to the SRAM 305 and executes the sub CPU FW 1104. Next, in step S1206, the CPU core 301 loads the ROM-ID 1106 from the flash ROM 1027 to a Crypto RAM 311.

Furthermore, in step S1207, the CPU core 301 obtains, from a ROM-ID 506, the address of the HDD CPU BIOS FW 1101 and the address of the HDD CPU BIOS FW signature 1102.

Next, in step S1208, the CPU core 301 loads the HDD CPU BIOS FW signature 1102 to the SRAM 305. Next, in step S1209, the CPU core 301 causes the encryption processor 308 to obtain the hash value by decrypting the HDD CPU BIOS FW signature 1102 by using the public key attached to the sub CPU FW 1104.

Next, in step S1210, the CPU core 301 loads the HDD CPU BIOS FW 1101 to the SRAM 305. Next, in step S1211, the CPU core 301 causes the encryption processor 308 to calculate the hash value of the HDD CPU BIOS FW 1101. Subsequently, in step S1213, the CPU core 301 compares the hash value obtained in step S1209 with the hash value obtained in step S1211. If the hash values match (YES), the process advances to step S1214. The CPU core 301 controls a GPIO 303 to output the reset signal 1029 at "Hi" level, and ends the processing. Otherwise (NO), the processing ends directly.

As described above, an information processing apparatus according to this embodiment includes a main CPU that executes processing in accordance with a program code and an HDD controller that controls communication with the main CPU and communication with a predetermined load in accordance with another predetermined program code. The information processing apparatus also includes a first ROM that stores a program code to be executed by the main CPU and a second ROM that stores a program code to be executed by the HDD controller. In addition, the information processing apparatus includes a sub CPU that verifies the program code stored in the first ROM before the program code is executed by the main CPU. Furthermore, the information processing apparatus includes a sub CPU that verifies the program code stored in the second ROM before the program code is executed by the HDD controller. In this manner, according to this embodiment, the sub CPU 115 and the sub CPU 1026 are used separately to detect a boot code alteration in the ROMs of a CPU core 201 and the CPU core 401 which are components of the main CPU and the HDD controller, respectively. Subsequently, boot code alteration detection is executed for each individual CPU, and, as a result, notification as to whether an alteration occurred can be performed.

Third Embodiment

The third embodiment of the present invention will be described hereinafter. This embodiment will describe control performed based on the verification result of a code to be executed by an HDD controller 124. Note that, unless otherwise mentioned, the present invention is applicable, as a matter of course, to a single device or a system formed by a plurality of devices as long as the function of the present invention can be executed.

<Processing Procedure of Main CPU 101>

The processing procedure of a main CPU 101 of a case in which the verification result of the HDD controller 124 indicates a mismatch according to this embodiment will be described with reference to FIG. 11.

In step S901, a CPU core 201 of the main CPU 101 immediately loads, upon canceling the reset state, a main CPU BIOS 501 stored in a flash ROM 112 to a DRAM 102. Next, in step S902, the CPU core 201 executes the main CPU BIOS 501, and initialization processing of inputs to/outputs from the main CPU 101 is executed.

Next, in step S903, the CPU core 201 confirms the verification result of the HDD controller 124. If the verification result indicates a mismatch, the process advances to step S907. The CPU core 201 instructs an operation unit OF 113 to perform an error display operation of an HDD 125, the error of the HDD 125 is displayed on an operation unit 103, and the processing ends. As a result, the error display operation can be performed on the MFP when the verification result of the HDD controller 124 indicates a mismatch.

On the other hand, if the HDD 125 can be activated, the process advances to step S904. The CPU core 201 loads an OS (Operating System) from the HDD 125 to the DRAM 102 and performs activation in step S905. Next, in step S906, the CPU core 201 executes initialization processing of a printer unit 105, a scanner unit 106, a FAX 107, an image processor 111, a network OF 104, and the operation unit 103 to shift to a state that allows operation as an MFP, and the processing ends.

As described above, a main CPU according to this embodiment will cause an operation unit of an information processing apparatus to perform an error display operation when a sub CPU fails to verify a program code to be executed by an HDD controller. According to this embodiment, boot code alteration verification of each ROM is performed by the main CPU 101 and a CPU core 401 which is a component of the HDD controller 124. As a result, if it is determined that the CPU core 401 as a component of the HDD controller 124 has been altered, activation will be performed in only the main CPU 101 that has been determined not to have any problems in the alteration determination, and error notification of the apparatus can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-080470 filed on Apr. 19, 2019, which is hereby incorporated by reference herein in its entirety.

What is claimed is:

1. An information processing apparatus comprising:
a first controller that executes a first program code;
a second controller that executes a second program code different from the first program code, and communication with the first controller;
a storage device that stores the first program code to be executed by the first controller and the second program code to be executed by the second controller; and
a verifier that verifies, before the first controller and the second controller execute respective program codes, the respective program codes, stored in the storage device,
wherein the verifier cancels a reset signal of the first controller via a first dedicated signal line to the first controller when the first program code is verified, and cancels a reset signal of the second controller via a second dedicated signal line to the second controller when the second program code is verified.

2. The apparatus according to claim 1, wherein the second controller further executes communication with a non-volatile storage device, and
the control of the communication with the first controller and the communication with the non-volatile storage device includes processing to transmit data received from the first controller to the non-volatile storage device and processing to transmit data received from the non-volatile storage device to the first controller.

3. The apparatus according to claim 2, wherein the second program code to be executed by the second controller includes a program code of data encryption and data decryption, and
the control of communication with the non-volatile storage device by the second controller includes processing in which the second controller encrypts data to be transmitted to the non-volatile storage device and decrypts data received from the non-volatile storage device in accordance with the program code verified by the verifier.

4. The apparatus according to claim 1, wherein the second controller further executes communication with an HDD, and
the second controller functions as a bridge between the first controller and the HDD by reading out and executing the program code verified by the verifier.

5. The apparatus according to claim 4, wherein the verifier comprises
a boot ROM that stores a boot code of the verifier, and
an OTP (One Time Programmable) memory area that stores verification information to be used for verifying each program code.

6. The apparatus according to claim 4, wherein the storage device stores
verification information to be used for verifying each program code, and a program code of a BIOS of the first controller, a program code of a BIOS and a program code of FW of the second controller, and a program code of FW of the verifier as the program codes.

7. The apparatus according to claim 6, wherein when the reset signal is canceled by the verifier, the first controller reads out the program code of the BIOS of the first controller from the storage device, reads out an OS stored in the HDD, and executes initialization processing of the information processing apparatus.

8. The apparatus according to claim 1, wherein when the reset signal received from the verifier is canceled, each of the first controller and the second controller activates by reading out the corresponding program code from the storage device and executing the corresponding program code.

9. The apparatus according to claim 1, wherein the first controller causes an operation unit of the information processing apparatus to perform an error display operation when the verifier fails to verify the second program code to be executed by the second controller.

10. An information processing apparatus comprising:
a first controller that executes a first program code;
a second controller that executes a second program code different from the first program code, and communication with the first controller;
a first storage device that stores the first program code to be executed by the first controller;
a second storage device that stores the second program code to be executed by the second controller; and
a verifier that verifies the first program code stored in the first storage device before the first controller executes the first program code, and verifies the second program code stored in the second storage device before the second controller executes the second program code.

11. An information processing apparatus comprising:
a first controller that executes a first program code;
a second controller that executes a second program code different from the first program code, and communication with the first controller;
a first storage device that stores the first program code to be executed by the first controller;
a second storage device that stores the second program code to be executed by the second controller;
a first verifier that verifies the first program code stored in the first storage device before the first controller executes the first program code stored in the first storage device; and
a second verifier that verifies the second program code stored in the second storage device before the second controller executes the second program code stored in the second storage device.

12. A method for controlling an information processing apparatus that includes a first controller that executes a first program code, a second controller that executes a second program code different from the first program code, and communication with the first controller, and a storage device that stores the first program code to be executed by the first controller and the second program code to be executed by the second controller, the method comprising:
verifying, before the first controller and the second controller execute respective program codes, the respective program codes, stored in the storage device,
cancelling a reset signal of the first controller via a first dedicated signal line to the first controller when the first program code is verified, and cancelling a reset signal of the second controller via a second dedicated signal line to the second controller when the second program code is verified.

13. A method for controlling an information processing apparatus that includes a first controller that executes a first program code, a second controller that executes a second program code different from the first program code, and communication with the first controller, a first storage device that stores the first program code to be executed by the first controller, and a second storage device that stores the second program code to be executed by the second controller, the method comprising;
verifying the first program code stored in the first storage device before the first controller executes the first program code and verifying the second program code stored in the second storage device before the second controller executes the second program code.

14. A method for controlling information processing apparatus that includes a first controller that executes a first program code, a second controller that executes a second program code different from the first program code, and communication with the first controller, a first storage device that stores the first program code to be executed by the first controller, and a second storage device that stores the second program code to be executed by the second controller, the method comprising:
verifying the first program code stored in the first storage device before the first controller executes the first program code stored in the first storage device; and
verifying the second program code stored in the second storage device before the second controller executes the second program code stored in the second storage device.

* * * * *